J. S. SMITH.
Thill-Coupling.
No. 162,202.
Patented April 20, 1875.
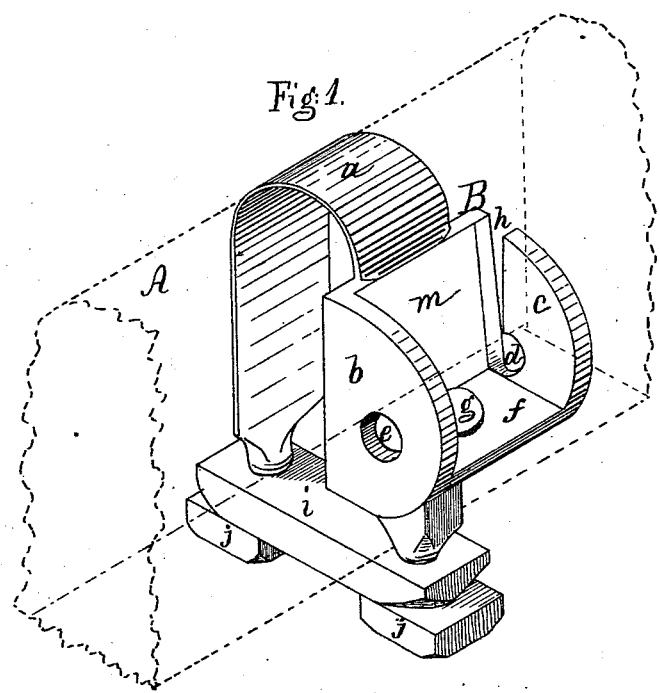
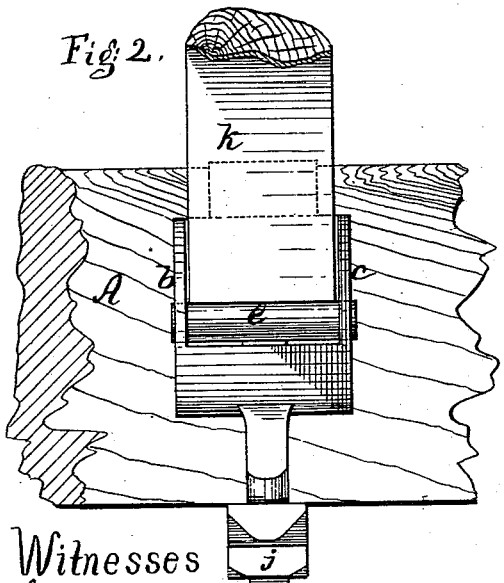
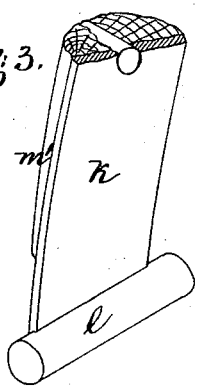
Witnesses
Inventor
Jerome S. Smith

UNITED STATES PATENT OFFICE.

JEROME S. SMITH, OF PROVINCETOWN, MASSACHUSETTS.

IMPROVEMENT IN THILL-COUPLINGS.

Specification forming part of Letters Patent No. 162,202, dated April 20, 1875; application filed October 19, 1874.

*To all whom it may concern:*

Be it known that I, JEROME S. SMITH, of Provincetown, in the county of Barnstable and State of Massachusetts, have invented an Improved Shaft-Coupling for Vehicles, of which the following is a specification:

My invention consists in an improved device for connecting the shafts of vehicles to the axle-tree, and it is so constructed as to admit of the shafts being readily attached to, and detached from, the axle-tree, and when attached to be securely held without the use of bolts and nuts, as in the ordinary method.

Referring to the drawings, Figure 1 is a perspective view of my invention; Fig. 2 shows the manner of connecting the shaft to the axle, and Fig 3 shows the end of the shaft to be attached to the axle.

Similar letters represent like parts in the several figures.

A represents a portion of the axle-tree to which the coupling portion B is attached. Two of these couplings are placed upon each axle so as to receive the ends of the two shafts. The coupling portion B is composed of a back, $m$, and two side pieces, $b$ $c$, projecting at right angles from the same, and a seat, $f$, formed with a cavity for the reception of a piece of india-rubber, $g$, or other elastic material for the purpose of preventing rattling of the parts. At the lower end of each projecting piece $b$ and $c$ is a hole, $e$ $d$. In one of the projecting sides $c$ is a beveled slot or opening, $h$, extending from the top of the same to the hole $d$. The coupling portion B is secured to the axle by means of the piece $a$, which forms a part of the same, and extends over the top of the axle, and, passing down in the rear through the bar $i$, is secured by a nut, $j$. Under the front portion is also a projection passing through the bar $i$, and secured by a nut, $j$. $l$ in Fig. 3 represents a cylindrical bar or bolt attached by means of a metal strap, $k$, to the shaft $m^1$. The ends of the bolt $l$ extend beyond the sides of the strap $k$, as shown in Figs. 3 and 2.

The mode of attaching the shafts to the axle is as follows:

The shafts are elevated so as to allow the bolt $l$ to pass sidewise through the hole $d$ into the opposite hole $e$, at the same time allowing the lower portion of the strap $k$ to pass through the opening $h$. The shafts being lowered, the bolt or bar $l$ bears against the elastic cushion $g$, and the shafts are then securely fastened to the axle, and can only be released therefrom by bringing them to an upright position again. The opening for the elastic cushion in the bottom $f$ may extend the whole width of the same. The portion of coupling attached to the axle is to be made of malleable iron, and the bolt $l$ and strap $k$ of wrought-iron.

It will be readily seen that the shafts, when thus attached to the axle, are absolutely secure, and by no motion of the horse, when harnessed to the vehicle, can the shafts become disengaged from the vehicle.

The portion $a$, by which the coupling B is secured to the axle-tree, is cast in a straight piece together with the coupling B, and, being of malleable iron, can be bent to fit over any shaped axle-tree, whether curved or any other form.

I am aware that it is not broadly new to construct the clip of a thill-coupling so that the end of the thill can only be placed therein in a vertical position, the thill being then turned downward, whereby it cannot be accidentally displaced, and such, broadly, I disclaim.

Having thus described my invention, what I claim as new, and desire to secure by Letters Patent, is—

The clip B, having the solid vertical back $m$, and lateral side pieces $b$ $c$, with the openings $e$ and $d$, the vertical opening or slot $h$, and flat seat $f$, having a cushion, $g$, all constructed and combined for operation in connection with the shaft, having the cylindrical bolt $l$, as and for the object specified.

In testimony whereof, I have signed my name to this specification in the presence of two subscribing witnesses.

JEROME S. SMITH.

Witnesses:
 J. H. ADAMS,
 MATTHIAS J. LAMBRECHT.